United States Patent [19]

Kampf et al.

[11] Patent Number: 4,556,754
[45] Date of Patent: Dec. 3, 1985

[54] PROCESS FOR THE ISOMERIZATION OF ISOLATED DOUBLE BONDS TO CONJUGATED DOUBLE BONDS IN LOW-MOLECULAR WEIGHT HOMO- AND/OR COPOLYMERS OF 1,3-DIENES

[75] Inventors: Wolfgang Kampf, Haltern; Christoph Herrmann, Marl, both of Fed. Rep. of Germany

[73] Assignee: Chemische Werke Huels Aktiengesellschaft, Marl, Fed. Rep. of Germany

[21] Appl. No.: 467,978

[22] Filed: Feb. 18, 1983

[30] Foreign Application Priority Data

Feb. 19, 1982 [DE] Fed. Rep. of Germany ....... 3205990
Jul. 24, 1982 [DE] Fed. Rep. of Germany ....... 3227685
Jul. 24, 1982 [DE] Fed. Rep. of Germany ....... 3227684

[51] Int. Cl.$^4$ ................................................ C07C 5/25
[52] U.S. Cl. .................................... 585/664; 585/665
[58] Field of Search ........................ 585/664, 665, 377

[56] References Cited

U.S. PATENT DOCUMENTS

| T950,007 | 9/1976 | Oziomek. | |
|---|---|---|---|
| 3,162,658 | 12/1964 | Baltes et al. . | |
| 3,169,987 | 2/1965 | Bloch | 585/664 |
| 3,201,493 | 8/1965 | Meisinger et al. | 585/664 |
| 3,213,155 | 10/1965 | Schreisheim et al. | 585/665 |
| 3,217,050 | 11/1965 | Schreisheim et al. | 585/664 |
| 3,984,444 | 10/1976 | Ritz et al. . | |
| 4,085,263 | 4/1978 | Otsuki et al. . | |
| 4,085,265 | 4/1978 | Otsuki et al. . | |

FOREIGN PATENT DOCUMENTS 925148 5/1963 United Kingdom .
1011835 12/1965 United Kingdom .

OTHER PUBLICATIONS

Defensive Publication, 9-7-76; T950007, Bailey's Industrial Oil and Fat Products, Swern, ed., pp. 15,22,73, 88-89, 1054-1055, 3rd ed., Interscience.

Primary Examiner—William R. Dixon, Jr.
Assistant Examiner—Cynthia A. Prezlock
Attorney, Agent, or Firm—Millen & White

[57] ABSTRACT

A process for the isomerization of isolated double bonds to conjugated double bonds in low-molecular weight homo- and/or copolymers of 1,3-dienes uses an isomerization catalyst optionally in the presence of a solvent, wherein the isomerization catalyst is a mixture of (a) a hydroxide of the alkali metals potassium, rubidium, or cesium, and an alcohol or
(b) a lithium alcoholate or sodium alcoholate and a potassium, rubidium, or cesium salt or
(c) sodium hydroxide, an alcohol, and a polar, aprotic compound.

The isomerization is conducted at a temperature of 80°–220° C.

19 Claims, No Drawings

PROCESS FOR THE ISOMERIZATION OF ISOLATED DOUBLE BONDS TO CONJUGATED DOUBLE BONDS IN LOW-MOLECULAR WEIGHT HOMO- AND/OR COPOLYMERS OF 1,3-DIENES

BACKGROUND OF THE INVENTION

In the homopolymerization of 1,3-dienes, as well as in their copolymerization with one another or with other monomers, e.g., vinyl-substituted aromatics, polymers are obtained having isolated double bonds in the primary chain.

However, it is known that low and high molecular weight compounds with conjugated double bonds are superior with respect to reactivity, and thus also attractiveness, to the corresponding compounds having isolated double bonds. For this reason, processes have been developed for the production of compounds with conjugated double bonds. Suitable procedures, in this connection, include, for example, copolymerization of 1,3-dienes with acetylene [J. Furukawa et al., Journ. Polym. Sci., Polym. Chem. Ed. 14: 1213-19 (1976)]. Another, and more economical, possibility is the isomerization of isolated double bonds to conjugated double bonds. To conduct this isomerization, a great variety of different catalyst systems has been utilized.

Thus, DAS No. 1,174,071 discloses a process for the isomerization of butadiene polymers wherein the butadiene polymers are heated to temperatures of between 100° and 300° C. in the presence of small amounts of transition metals of Groups VI through VIII of the Periodic Table of the Elements and/or of compounds wherein these metals are present in the zero valence state. The disadvantages of this process reside in the relatively high cost of the isomerization catalysts and their lack of handling ease. Moreover, they effect cis-trans isomerization which leads to the loss of reactive cis-1,4-structures.

Furthermore, according to the process described in DOS No. 2,342,885, the combination of an organic alkali metal compound and a specific diamine is usuable as the isomerization catalyst for low-molecular weight homo- and copolymers of butadiene. The chelating effect of the diamines employed results, however, in a relatively high content of alkali metal ions in the polymer. This has an adverse influence, for example, when this polymer is used in the varnish (paint) sector. Furthermore, the combination of polymerization and isomerization, described as preferred, does not yield the high content of cis-1,4-structures advantageous for the drying properties of low-molecular weight polybutadienes.

Also, German Pat. No. 1,156,788 and DAS No. 1,156,789 disclose processes for converting fatty acid esters of monohydric alcohols with isolated double bonds into fatty acid esters having conjugated double bonds wherein alkali metal alcoholates are utilized as the isomerization catalysts.

The application of these processes to other classes of compounds could not be expected, at least for the reason that the isomerization activity recedes markedly even if merely transferred to esters of polyhydric alcohols, such as, for example, naturally occurring oils.

In this respect, it was surprising to find it possible to convert isolated double bonds into conjugated double bonds in homo- and/or copolymers of 1,3-dienes, using sodium and potassium alcoholates. See DOS's Nos. 2,924,548.5, 2,924,598.5, 2,924,577.0 and 3,003,894.9 and its U.S. equivalent Ser. No. 160,807 of June 19, 1980, now abandoned, and DOS No. 3,003,872.3 and its U.S. equivalent Ser. No. 230,826 of Feb. 2, 1981, now abandoned, all of whose disclosures are incorporated by reference herein. Such unsaturated polymers are substantially different from the fatty acid esters (1,4-diene structures) with regard to the position of the double bonds (1,5-diene structures).

SUMMARY OF THE INVENTION

It is an object of the present invention to improve the prior art processes especially that of DOS No. 2,924,598 in a simple and economical fashion.

Upon further study of the specification and appended claims, further objects and advantages of this invention will become apparent to those skilled in the art.

These objects have been attained by providing a process for the isomerization of isolated double bonds to conjugated double bonds in low-molecular wieght homo- and/or copolymers of 1,3-dienes using an isomerization catalyst optionally in the presence of a solvent, wherein the isomerization catalyst is a mixture of (a) a hydroxide of the alkali metals potassium, rubidium, or cesium, and an alcohol;

(b) a lithium alcoholate or sodium alcoholate and a potassium, rubidium, or cesium salt; or (c) sodium hydroxide, an alcohol, and a polar, aprotic compound;

and conducting the isomerization at a temperature of 80°-220° C.

In another aspect of this invention, the mixtures (a) or (b) are used together with a polar-aprotic compound, and the isomerization is conducted at a low temperature of 0°-150° C.

DETAILED DISCUSSION

This invention is surprising, e.g., inasmuch as it could not be expected that, for catalyst system (a) of this invention, a combination of potassium hydroxide, rubidium hydroxide, or cesium hydroxide and an alcohol could be employed in place of the previously formed alcoholate; for catalyst system (b) of this invention, the addition of a potassium, rubidium, or cesium salt, isomerization-inactive per se, markedly raises the isomerizating effect of lithium alcoholates or sodium alcoholates; and for catalyst system (c) of this invention, even a combination of sodium hydroxide and an alcohol could be made to yield satisfactory results by using as a further catalyst component an aprotic compound.

Suitable homo- and copolymers of 1,3-dienes include within the scope of this invention: homopolymers of, for example, 1,3-butadiene, isoprene, 2,3-dimethyl-butadiene, or piperylene; copolymers of these 1,3-dienes with one another, at least finite amount of the comonomers being used; and copolymers of these 1,3-dienes with vinyl-substituted aromatic compounds, such as, for example, styrene, α-methylstyrene, vinyltoluene, or divinylbenzene. The content of vinyl-substituted aromatic monomers in these copolymers is usually not to exceed 50 molar percent. Such products can be prepared according to many known procedures of the prior art. See, for example, German Pat. No. 1,186,631; DAS No. 1,212,302; German Pat. No. 1,292,853; DOS No. 2,361,782; and DOS No. 2,342,885, all of whose disclosures are incorporated by reference herein.

Besides the "genuine" copolymers produced by the polymerization of 1,3-dienes with vinyl-substituted aromatic compounds, copolymers within the scope of this invention also include the reaction products of 1,3-dienes and aromatic hydrocarbons. These "false" copolymers involve arylated polyenes obtained by allowing a 1,3-diene, such as, for example, 1,3-butadiene or piperylene, to react in an aromatic solvent, such as, for example, benzene or toluene, in the presence of a suitable catalyst. See, e.g., German Pat. Nos. 1,137,727 and 1,170,932; U.S. Pat. No. 3,373,216; Japanese Laid-Open Application No. 49-32985; and DOS's Nos. 2,848,804 and 3,000,708, all of whose disclosures are incorporated by reference herein.

Preferably, the process of this invention utilizes polybutadienes having molecular weights ($\overline{M}n$) of 500–20,000, especially 600–10,000, and quite particularly 800–6,000. The microstructure of the dienes in the homo- or copolymers generally is uncritical, but it is advantageous to have at least 20% of the double bonds with a cis-1,4 structure. All such polymers are well known; see, e.g., B. Schleimer and H. Weber, Die Angewandte Makromoleculare Chemie 16/17 (1971), 253–269, which disclosure is incorporated by reference herein.

Suitable isomerization catalysts for use in the present process include catalyst (a): a mixture of (i) an hydroxide of the alkali metals: potassium, rubidium, or cesium; and (ii) an alcohol. The aforementioned hydroxides are commercially available products, usually used as such in solid form. Suitable alcohols include $C_{1-10}$-hydrocarbon based alcohols.

Mono- or polyhydric, primary, secondary, or tertiary alcohols of up to and including 10 carbon atoms, preferably 3–8 carbon atoms, which optionally can carry functional groups, such as, for example, —$NH_2$, are utilized together with the hydroxides. Typical alcohols include, for example, methanol, ethanol, n- or isopropanol, n-, iso-, sec-, or tert-butanol, 2-ethylhexanol, cyclohexanol, benzyl alcohol, glycol, diethylene glycol, ethanolamime, or glycerol. Among these, the butanols, cyclohexanol, and benzyl alcohol are preferred. Thus, the alcohols generally are $C_{1-10}$-hydrocarbon mono- or poly-alkanols optionally substituted by, e.g., —$NH_2$ or phenyl.

The alkali metal hydroxide is generally utilized in an amount of 0.2–20 parts by weight, preferably 0.5–10 parts by weight per 100 parts by weight of the homo- and/or copolymer of 1,3-dienes to be isomerized. The quantity of alcohol is generally 0.5–20 parts by weight, preferably 1–10 parts by weight per 100 parts by weight of the product to be isomerized.

As for the molar proportion of the two catalyst components in mixture (a), an excess of the alcohol is suitably employed, i.e., the molar ratio of alkali metal hydroxide to alcohol generally is from 1:>1 to 1:12. A molar excess of alkali metal hydroxide, namely preferably in the range from 1.5:1 to 5:1, should only be utilized if the amount of the alcohol employed is smaller than about 3 parts by weight per 100 parts by weight of the product to be isomerized. It is best to determine the optimum amounts of catalyst by routine preliminary tests.

As an alternative to catalyst system (a), the process of this invention can also utilize catalyst (b): a mixture of (i) a lithium or sodium alcoholate; and (ii) a potassium, rubidium, or cesium salt.

The use of alkali metal alcoholates per se for the isomerization of isolated double bonds to conjugated double bonds is conventional—as has been mentioned above. However, in this connection, heretofore only the potassium alcoholates have been of industrial interest, since they exhibit a higher isomerization activity as compared with either the lithium alcoholates or the economical sodium alcoholates.

Since, generally, the alkali metal per se is required at some stage during the production of the alkali metal alcoholates [cf. "Ullmanns Encyklopaedie der technischen Chemie" [Ullmann's Encyclopedia of Industrial Chemistry] 3:280 (1953)], there are considerable price differences between sodium alcoholates and potassium alcoholates. For this reason, great economic interest has existed in developing an isomerization method using sodium alcoholates wherein its isomerization activity is at least equivalent to that observed when potassium alcoholates are used.

As the alcoholate component of catalyst system (b), the process of this invention can utilize the lithium and, preferably, the sodium compounds of all mono- and polyhydric, primary, secondary, and tertiary alcohols, e.g., those mentioned above. Preferred are the alcoholates of monohydric (cyclo)aliphatic alcohols of up to and including 10, preferably 3–8 carbon atoms. Typical alcoholates which can be employed are lithium and sodium isopropylate, lithium and sodium tert-butylate, as well as lithium and sodium 2-ethylhexylate.

A potassium, rubidium, or cesium salt is used together with the lithium or sodium alcoholate. Potassium salts are preferred for economic reasons, inter alia. The term "salt" within the scope of this invention includes all reaction compatible anions, not only the typical neutralization products of inorganic and organic acids, such as, for example, carbonic acid, sulfuric acid, hydrochloric acid, formic acid, acetic acid, propionic acid, and 2-ethylhexanoic acid, with the corresponding alkali metal hydroxides, but also the hydroxides themselves.

The lithium or sodium alcoholate is generally utilized in a quantity of 0.5–10 parts by weight, preferably 1–5 parts by weight per 100 parts by weight of the homo- and/or copolymer of 1,3-dienes to be isomerized. The amount of potassium, rubidium, or cesium salt employed is generally 0.1–25 parts by weight, preferably 10–20 parts by weight per 100 parts by weight of the product to be isomerized.

Since the potassium, rubidium, or cesium salt utilized is in most cases present in the reaction mixture in extensively undissolved form, it is not practical to indicate ranges for the molar proportion of the two catalyst components. The optimum isomerization conditions can be readily determined by routine preliminary orientation tests.

Finally, the process of this invention can employ, instead of catalyst systems (a) and (b), catalyst system (c) consisting essentially of sodium hydroxide, an alcohol, and an aprotic compound.

Suitable alcohols again include all those mentioned above with respect to catalyst (a), e.g., primary, secondary, and tertiary alcohols of up to 10 carbon atoms optionally carrying functional groups, such as, for example, —$NH_2$. Alcohols of 3–8 carbon atoms are preferably employed.

As a further component, the isomerization catalyst contains a polar, aprotic compound. Suitable polar, aprotic compounds include, for example, dimethyl sulfoxide, dimethylformamide, dimethylacetamide, tetramethylurea, tetramethylenesulfone, N-methylpyrrolidone, isophorone, acetophenone, ethylene carbonate, and polyethylene glycol diethers of the formula R—O—(—$CH_2$—$CH_2$—O—)$_n$R, wherein n is 1–20, preferably 1–10, and R is $C_{1-4}$-alkyl. Besides the polyethylene glycol dialkyl ethers, preferred are dimethyl sulfoxide, dimethylformamide, and N-methylpyrrolidone.

The sodium hydroxide is generally utilized as a commercial product in solid form in an amount of 0.2–20 parts by weight, preferably 0.5–10 parts by weight per 100 parts by weight of the homo- or copolymer of 1,3-dienes to be isomerized. The amount of alcohol utilized is generally again 0.5–20 parts by weight, preferably 1–10 parts by weight per 100 parts by weight of the product to be isomerized. The polar, aprotic compound is utilized in general in a quantity of 1–100 grams per 100 grams of polymer. The specific amount to be added is dependent on the degree of isomerization desired and on the reaction temperature selected, and can be determined by routine preliminary tests.

As for the molar ratios of the individual catalyst components in mixture (c), a molar excess of the alcohol is preferably employed, based on the amount of sodium hydroxide used, i.e., the molar ratio of sodium hydroxide to the alcohol is generally in a range of 1:>1 to 1:12. A molar excess of sodium hydroxide, namely, preferably in the range of from 1.5:1 to 5:1, should be utilized solely if the amount of alcohol employed is smaller than about 3 parts by weight per 100 parts by weight of the product to be isomerized. The molar ratio of the polar, aprotic compound to sodium hydroxide is in the range of 0.01 to 100. It is best to determine the optimum amounts of the individual catalyst ingredients by routine preliminary tests.

The process of this invention is carried out at temperatures of 80°–200° C., preferably 120°–200° C., especially preferably 140°–190° C.

According to a special embodiment of the process of this invention, when using catalyst system (a) or (b), it is possible to lower the isomerization temperature by up to 100° C., at the same catalyst concentration and degree of isomerization, by the addition of a polar, aprotic compound. This means that, by adding the same aprotic compounds described with respect to catalyst system (c), the process of this invention can then be conducted at temperatures of 0°–150° C., preferably 20°–130° C.

The polar, aprotic compound is again used, just as for catalyst system (c), in an amount of 1–100 grams per 100 grams of polymer. The specific amount to be added here again depends on the degree of isomerization desired and on the reaction temperature selected and can be determined by routine preliminary experiments.

The polymer to be isomerized can be employed with a solvent as well as without a solvent, in connection with all catalyst systems of this invention. The use of a solvent is advantageous and/or necessary if the viscosity of the polymer is so high that homogeneous distribution of the catalyst components cannot be ensured.

Suitable solvents include, for example, aliphatic, cycloaliphatic, and aromatic hydrocarbons. Typical representatives of these groups include hexane, octane, cyclohexane, toluene, and xylene.

The procedure when conducting the process of this invention generally involves contacting the polymer to be isomerized, optionally dissolved in a solvent, with the isomerization catalyst, and heating it to the desired temperature. The required reaction time is dependent on the type and amount of catalyst, on the polymer to be isomerized, and on the temperature. The optimum reaction time can be readily determined by a few routine experiments. The reaction is terminated, for example, by cooling to room temperature (25° C.). Up to this process step, all operations are preferably conducted under an inert gas atmosphere, such as nitrogen or argon, for example. Subsequently the catalyst is most extensively removed by an aqueous scrubbing step and/or an adsorptive treatment, for example with bleaching clay. Further possibilities for working up the reaction mixture reside in using ion exchangers or removal by filtration or centrifuging, if desired after lowering the viscosity of the solid catalyst components, for example, with hexane.

The homo- and/or copolymers of 1,3-dienes isomerized in accordance with the process of this invention, which are preferably employed for the manufacture of coating compositions, exhibit up to 30% diene structures which are conjugated, based on the total number of double bonds. In addition, conjugated triene and tetraene structures are also present to a minor extent (<1%).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following example(s), all temperatures are set forth uncorrected in degrees Celsius; unless otherwise indicated, all parts and percentages are by weight.

The conjuene (conjugated -ene) contents recited in the example were conventionally determined by UV spectropscopy and are given, in the case of the polybutadienes, as percent by weight values, calculated for $C_8H_{14}$ (conjugated dienes), $C_8H_{12}$ (conjugated trienes), and $C_8H_{10}$ (conjugated tetraenes). Room temperature in all examples means 25° C.

The microstructures were determined by IR spectroscopy and represent the proportionate values of the double bonds.

EXAMPLE 1

200 g of a polybutadiene oil ($\overline{M}n=1,500$) with 76% cis-1,4-structures and a content of conjugated double bonds of <0.5% was charged into a heated and argon-purged agitated flask (1 liter capacity) equipped with argon connection, stirrer, thermometer, and exhaust gas connection. The thus-described apparatus was also utilized in all subsequent examples and comparative examples. At room temperature (25° C.), 16 g of tert-butanol and 4 g of pulverized, commercially available potassium hydroxide were added, and the content of the flask was heated to a temperature of 180° C. under agitation and passing a weak argon stream over the reaction mixture. The previously colorless mixture is thus discolored to dark-brown. Sampling is conducted hourly up to a testing period of four hours. The samples were cooled to room temperature to interrupt the isomerization reaction. The hourly samples were not worked up. The final sample was centrifuged for one hour at 3,600 rpm to separate solid catalyst components. For neutralizing, gaseous $CO_2$ was introduced (three times stoichiometric excess with respect to the potassium hydroxide employed).

IR Testing of all samples revealed that the microstructure had not changed during the entire space of time, i.e. the cis-1,4-proportions valuable for the drying action remained preserved. The absolute double bond contents were 80% to 95%.

Table 1 lists the temporal evolution of the contents of conjugated structures, determined by UV absorption.

TABLE 1

| | Conjugated -ene Contents (%) | | |
|---|---|---|---|
| Time (h) | Conj. Diolefins Calculated as $C_8H_{14}$ | Triolefins Calculated as $C_8H_{12}$ | Tetraolefins Calculated as $C_8H_{10}$ |
| 1 | 11.6 | 0.06 | 0.02 |
| 2 | 11.6 | 0.07 | 0.02 |
| 3 | 15.0 | 0.08 | 0.03 |
| 4 | 26.0 | 0.12 | 0.04 |

The product was applied to sheet metal in a wet-film coating thickness of 50 μm and examined pursuant to DIN [German Industrial Standard] 53 150 with respect to drying characteristics. The following values resulted:

Dust-dry within 1½ hours.
Thoroughly dry within 2 hours.

The starting material exhibited a dust-dry and thoroughly dry time period of 7 hours.

COMPARATIVE EXAMPLE A 200 g of commercial linseed oil was used for an attempt to isomerize this material under the conditions of Example 1. No absorption which could be associated with conjugated structures was obtained in UV.

EXAMPLES 2 AND 3

Rubidium hydroxide and cesium hydroxide were used in place of potassium hydroxide. The procedure was to charge the apparatus described in Example 1 with the same polybutadiene oil, as well as 8 g of the respective alkali metal hydroxide and 15 g of tert-butanol, and to heat the mixture to 150° C. After a testing period of 2 hours, the following data were obtained:

TABLE 2

| | | Conjugated -ene Content (%) | | |
|---|---|---|---|---|
| Ex. No. | Type of Hydroxide | Conj. Diolefins Calculated as $C_8H_{14}$ | Triolefins Calc. as $H_8H_{12}$ | olefins Calc. as $C_8H_{10}$ |
| 2 | RbOH.2H$_2$O | 15.7 | 0.18 | 0.14 |
| 3 | CsOH.H$_2$O | 14.2 | 0.21 | 0.17 |

EXAMPLES 4 TO 10

With the use of 100 g of the polybutadiene oil employed in Example 1, various alcohols were introduced, together with various amounts of potassium hydroxide. The results are listed in Table 3.

TABLE 3

| | | | | | | Conjugated -ene Content (%) | |
|---|---|---|---|---|---|---|---|
| Example No. | KOH (g) | Type and Amount of Alcohol | (g) | T (°C.) | t (h) | Conjugated Diolefins Calc. as $C_8H_{14}$ | Triolefins Calculated as $C_8H_{12}$ |
| 4 | 5 | CH$_3$OH | 10 | 200 | 2 | 7.6 | 0.21 |
| 5 | 5 | C$_6$H$_5$CH$_2$OH | 8 | 180 | 2 | 12.0 | 0.2 |
| 6 | 2.5 | Ethanolamine | 4.5 | 150 | 2 | 6.6 | 0.05 |
| 7 | 2.5 | Cycolhexanol | 8.0 | 150 | 2 | 19.4 | 0.08 |
| 8 | 2.5 | n-Butanol | 4.9 | 150 | 4 | 26.0 | 0.05 |
| 9 | 2.5 | Isobutanol | 4.9 | 150 | 4 | 15.7 | 0.05 |
| 10 | 2.5 | sec-Butanol | 4.9 | 150 | 4 | 15.5 | 0.04 |

EXAMPLES 11 TO 15

Respectively 5 g of KOH and 8 g of tert-butanol were combined with various oils in the manner described in Example 1. The results are contained in Table 4.

TABLE 4

| Ex. No. | Oil Type * | T (°C.) | t (h) | Conjugated -ene Content (%) Diolefins |
|---|---|---|---|---|
| 11 | VPO | 150 | 1 | 7.3 |
| 12 | PO 130 | 150 | 4 | 26.0 |
| 13 | PO 160 | 150 | 2 | 4.3 |
| 14 | St/Bu | 180 | 2 | 6.2 |
| 15 | PIP | 180 | 2 | 2.5 |

| | | Distribution of Double Bonds (%) | | | Styrene |
|---|---|---|---|---|---|
| | $\overline{M}n$ | trans-1,4 | 1,2 | cis-1,4 | (%) |
| VPO | 930 | 12 | 42 | 46 | 0 |
| PO 130 | 3000 | 19 | 1 | 80 | 0 |
| PO 160 | 6000 | 12 | 3 | 85 | 0 |
| St/Bu | 960 | 12 | 5 | 54 | 29 |
| PIP | 1600 | 51(3.4) | 3 | 41(1,4) | 0 |

(*)Types of Oil:
VPO Vinyl polyoil (prepared according to Example 8 of DAS 2,361,782)
PO 130 Commercial product from Chemische Werke Huels AG
PO 160 Commercial product from Chemische Werke Huels AG
St/Bu Copolymer oil styrene/butadiene (prepared along the lines of German Patent 1,212,302)
PIP Polyisoprene oil produced with LiBu.

EXAMPLES 16 AND 17

Example 1 was repeated in p-xylene (weight ratio oil:p-xylene=1:1) at boiling temperature (138.4° C.) (Example 16). After 3 hours, a conjugated -ene content was determined of 13.2%.

An analogous experiment was conducted in toluene at 100° C. (Example 17). In this case, a conjugated -ene content of 5% was obtained after 5 hours.

EXAMPLES 18–24

Using the same procedure as in Example 1, the amounts of KOH and of tert-butanol, as well as the temperature were varied. The results for this testing series are set forth in Table 5 (amount of oil used as starting material: 100 g).

TABLE 5

| Ex. No. | KOH (g) | tert-Butanol (g) | T (°C.) | t (h) | Conjugated -ene Content (%) Diolefin |
|---|---|---|---|---|---|
| 18 | 3 | 1 | 180 | 2 | 6.5 |
| 19 | 0.5 | 8 | 180 | 2 | 15.2 |
| 20 | 5 | 12 | 150 | 4 | 10.5 |
| 21 | 15 | 5 | 150 | 2 | 14.6 |
| 22 | 1 | 8 | 120 | 5 | 9.8 |
| 23 | 1 | 8 | 150 | 5 | 11.6 |

TABLE 5-continued

| Ex. No. | KOH (g) | tert-Butanol (g) | T (°C.) | t (h) | Conjugated -ene Content (%) Diolefin |
|---|---|---|---|---|---|
| 24 | 1 | 8 | 180 | 5 | 14.6 |

COMPARATIVE EXAMPLE B

A conjugated -ene content of merely 0.76% was obtained with 6 g of KOH without the presence of an alcohol during a 5-hour reaction period at 150° C.

EXAMPLE 25

100 g of the polybutadiene oil used in Example 1 was combined with the amounts of NaH (0.750 g) and tert-butanol (2.34 g) calculated for the production of 3 g of sodium tert-butylate, as well as with 20 g of commercial $K_2CO_3$. The content of the flask was brought to a temperature of 180° C. The temporal evolution of the conjugated -ene contents within 5 hours is indicated in Table 6.

TABLE 6

| Reaction Time (h) | Conjugated -ene Content (%) Diolefins |
|---|---|
| 1 | 4.7 |
| 2 | 11.4 |
| 3 | 12.1 |
| 4 | 14.6 |
| 5 | 14.9 |

COMPARATIVE EXAMPLE C

Under analogous conditions as in Example 25, a test was conducted with sodium tert-butylate (5 g/100 g polymer), prepared by stoichiometric reaction of NaH and tert-butanol, without $K_2CO_3$. The temporal evolution of the conjugated -ene contents was as follows:

| Time (h) | Conjugated -ene Content (%) Diolefins |
|---|---|
| 1 | 4.4 |
| 2 | 4.7 |
| 3 | 5.6 |
| 4 | 6.0 |
| 5 | 6.5 |

COMPARATIVE EXAMPLE D

An isomerization experiment with 15 g of $K_2CO_3$ at 180° C. yielded a conjugated -ene content of merely 0.79% after a reaction period of 5 hours.

EXAMPLES 26 TO 28

The hydroxides of K, Rb, and Cs were utilized in place of $K_2CO_3$ under similar testing conditions as in Example 25. The conditions and results are listed in Table 7 below.

EXAMPLES 29–34

Under similar testing conditions as in Example 25, potassium salts other than $K_2CO_3$ were utilized. The conditions and results are set forth in Table 8 below.

EXAMPLES 35–38

Example 25 was repeated under similar testing conditions with different alcoholates. Table 9 contains the results.

TABLE 7

| Example No. | Na tert-Butylate (g/100 g Oil) | Type and Amount of Hydroxide (g/100 g Oil) | | T (°C.) | t (h) | Conjugated -ene Content (%) Diolefins |
|---|---|---|---|---|---|---|
| 26 | 5 | KOH | 5 | 150 | 1 | 12.2 |
| 27 | 7 | $RbOH.2H_2O$ | 7 | 150 | 1 | 11.4 |
| 28 | 5 | $CsOH.H_2O$ | 8 | 150 | 2 | 13.1 |

TABLE 8

| Example No. | Na tert-Butylate (g/100 g Oil) | Type and Amount of Potassium Salt (g/100 g Oil) | | T (°C.) | t (h) | Conjugated -ene Content (%) Diolefins |
|---|---|---|---|---|---|---|
| 29 | 5 | KCL | 15 | 180 | 4 | 18.1 |
| 30 | 4 | KCL | 15 | 180 | 5 | 12.1 |
| 31 | 5 | KCL | 10 | 180 | 5 | 3.9 |
| 32 | 5 | KCL | 15 | 150 | 5 | 3.3 |
| 33 | 5 | $CH_3COOK$ | 15 | 180 | 3 | 17.6 |
| 34 | 5 | $K_2SO_4$ | 15 | 200 | 4 | 14.4 |

TABLE 9

| Example No. | Type and Amount of Alcoholate (g/100 g Oil) | | $K_2CO_3$ (g/100 g Oil) | T (°C.) | t (h) | Conjugated -ene Content (%) Diolefins |
|---|---|---|---|---|---|---|
| 35 | $NaOCH_3$ | 9 | 15 | 180 | 4 | 9.1 |
| 36 | $NaOCH_3$ | 9 | 15 | 200 | 4 | 5.3 |
| 37 | $LiO-tC_4H_9$ | 17.4 | 15 | 180 | 4 | 8.9 |
| 38* | $LiO-tC_4H_9$ | 8.5 | 15 | 180 | 4 | 11.5 |

(*)Li tert-butylate was prepared from n-butyllithium and tert-butanol.
Otherwise, the hydrides or amides serve as the starting materials.
The hydroxides in a mixture with alcohol and K salts result in inactive catalysts.

COMPARATIVE EXAMPLES E AND F

Examples 35 and 38 were repeated without adding $K_2CO_3$. In the former case (Comparative Example E), a conjugated -ene content was obtained of 1.78%; in the second case (Comparative Example F), a content of 0.8% was the result.

EXAMPLES 39 AND 40

Sodium tert-butylate (prepared as described in Example 25) was used together with KOH (5 g/100 g oil) as the isomerization catalyst. The results are disclosed in Table 10.

TABLE 10

| Ex. No. | Na tert-Butylate (g/100 g Oil) | T (°C.) | t (h) | Conjugated -ene Content (%) Diolefins |
|---|---|---|---|---|
| 39 | 5 | 150 | 1 | 12.2 |
| 40 | 5 | 180 | 1 | 11.5 |

EXAMPLES 41–45

Example 25 was repeated under similar conditions (5 g Na tert-butylate [produced from $NaNH_2$ and tert-butanol]/100 g oil, as well as 15 g of $K_2CO_3$/100 g oil), using oils of a different composition and microstructure as well as of a different molecular weight. The results are indicated in Table 11.

TABLE 11

| Ex. No. | Oil Type* | T (°C.) | t (h) | Conjugated -ene Content (%) Diolefins |
|---|---|---|---|---|
| 41 | VPO | 180 | 5 | 4.3 |
| 42 | PO 130 | 180 | 4 | 8.3 |
| 43 | PO 160 | 180 | 1 | 5.0 |
| 44 | St/Bu | 180 | 2 | 5.4 |
| 45 | PIP | 180 | 2 | 3.1 |

(*)Explanations, see TABLE 4.

EXAMPLES 46-55

Using the polybutadiene oil described in Example 1, the amounts of sodium alcoholate and $K_2CO_3$ were varied. The results are set forth in Table 12.

TABLE 12

| Example No. | Na tert-Butylate (g/100 g Oil) | $K_2CO_3$ (g/100 g Oil) | T (°C.) | t (h) | Conjugated -ene Content (%) Diolefins |
|---|---|---|---|---|---|
| 46 | 2 | 15 | 180 | 4 | 8.8 |
| 47 | 5 | 15 | 180 | 5 | 18.2 |
| 48 | 10 | 15 | 150 | 4 | 12.7 |
| 49 | 5 | 15 | 200 | 1 | 8.1 |
| 50 | 10 | 30 | 150 | 3 | 15.6 |
| 51 | 5 | 10 | 150 | 5 | 13.2 |
| 52 | 5 | 5 | 180 | 1 | 11.4 |
| 53 | 5 | 3 | 180 | 3 | 13.6 |
| 54 | 5 | 1 | 180 | 3 | 8.7 |
| 55 | 5 | 0.5 | 180 | 4 | 8.5 | t-BuOH = tert-butanol
NMP = N—methylpyrrolidone
DMSO = dimethyl sulfoxide
PEG = polyethylene glycol di-tert-butyl ether (MG 514)
EGE = ethylene glycol diethyl ether
DMF = dimethylformamide
The results are indicated in Table 13.

EXAMPLES 56 AND 57

The polybutadiene oil described in Example 1 was utilized. An isomerization of a mixture having a weight ratio of oil:toluene of 1:1, conducted at the boiling temperature of the toluene (110° C.), with 5 g of sodium tert-butylate/100 g oil, as well as 20 g of $K_2CO_3$/100 g oil (Example 56), yielded a conjugated -ene content of 3.3% after 4 hours.

Analogously, a conjugated -ene content of 13.2% was obtained at the boiling temperature of p-xylene (138.4° C.) with 5 g of sodium tert-butylate/100 g oil and 10 g of $K_2CO_3$/100 g oil (Example 57).

EXAMPLE 58

The microstructures were determined by IR spectroscopy and represent the proportionate values of the double bonds.

200 g of a polybutadiene oil with $\overline{M}n=1,500$ and 72% cis-1,4-structures, 27% trans-1,4-structures, and a conjugated double bond content of <0.5% was charged into a heated and argon-purged agitated flask (1,000 ml capacity) equipped with argon connection, stirrer, thermometer, and exhaust gas connection. The thus-described apparatus was also employed in all subsequent examples and comparative examples. At room temperature (25° C.), 10 g of tert-butanol, 6 g of pulverized, commercially available potassium hydroxide, together with 100 g of N-methylpyrrolidone were introduced. Under agitation and passing a weak argon stream over the reaction mixture, the content of the flask was heated to a temperature of 50° C. During this step, the previously colorless mixture was discolored to black-brown. Sampling was conducted hourly up to a testing period of 4 hours. The isomerization reaction was in each case terminated by cooling to room temperature; the volatile proportions were removed under an oil pump vacuum at 140° C. The final sample was centrifuged for one hour at 3,600 rpm in order to separate solid catalyst components. For neutralizing purposes, gaseous $CO_2$ was introduced (three times the stoichiometric excess with respect to the potassium hydroxide employed).

Examination of all samples by IR showed that the microstructure had not changed within the entire time period, i.e. the cis-1,4-proportions valuable for the drying activity were preserved. The content of conjugated diolefins, calculated as weight percent $C_8H_{14}$ by UV absorption, reached the maximum value of 23.1% by weight as early as after two hours. Conjugated triolefins, calculated as weight percent $C_8H_{12}$, were present to an extent of 0.2% by weight.

EXAMPLES 59-72

In analogous mode of operation as in Example 58, experiments were conducted under changed reaction conditions and with different polar, aprotic additives. The abbreviations mean:

t-BuOH = tert-butanol
NMP = N-methylpyrrolidone
DMSO = dimethyl sulfoxide
PEG = polyethylene glycol di-tert-butyl ether (MG 514)
EGE = ethylene glycol diethyl ether
DMF = dimethylformamide The results are indicated in Table 13.

TABLE 13

Each batch was prepared with 200 g of polybutadiene oil (see Example 58) together with 6 g of KOH and 10 g of tert-butanol.

| Ex. No. | Additive Type | Amount (g) | Temp. (°C.) | Time (h) | Conjugated Diolefins ($C_8H_{14}$) (% by Wt.) |
|---|---|---|---|---|---|
| 58 | NMP | 100 | 50 | 2 | 23.1 |
| 59 | NMP | 6 | 120 | 2 | 13.0 |
| 60 | NMP | 13.4 | 120 | 2 | 18.5 |
| 61 | NMP | 6 | 80 | 3 | 11.8 |
| 62 | NMP | 100 | 20 | 1 | 23.3 |
| 63 | NMP | 200 | 20 | 2 | 18.0 |
| 64 | DMSO | 100 | 20 | 3 | 17.1 |
| 65 | DMSO | 100 | 50 | 1 | 12.2 |
| 66 | DMSO | 10 | 80 | 3 | 14.0 |
| 67 | DMSO | 6 | 80 | 3 | 11.2 |
| 68 | DMSO | 6 | 120 | 1 | 15.6 |
| 69 | EGE | 8 | 120 | 2 | 13.5 |
| 70 | PEG | 12 | 120 | 2 | 19.5 |
| 71 | PEG | 6 | 120 | 1 | 21.0 |
| 72 | DMF | 200 | 120 | 2 | 18.6 |

COMPARATIVE EXAMPLES G-L

Tests without adding an aprotic compound were conducted in the apparatus described in Example 58. The results are shown in Table 14.

TABLE 14

Comparative examples using the same polybutadiene oil, but no additive.

| Ex. No. | KOH (g) | t-Butanol (g) | Temp. (°C.) | Time (h) | Conjugated Diolefins (% by Wt.) |
|---|---|---|---|---|---|
| G | 6 | 10 | 80 | 5 | 0.8 |
| H | 16 | 16 | 100 | 5 | 4.9 |
| I | 6 | 10 | 120 | 3 | 8.0 |

TABLE 14-continued

Comparative examples using the same polybutadiene oil, but no additive.

| Ex. No. | KOH (g) | t-Butanol (g) | Temp. (°C.) | Time (h) | Conjugated Diolefins (% by Wt.) |
|---|---|---|---|---|---|
| J | 6 | 10 | 150 | 2 | 14.6 |
| K | 16 | 10 | 150 | 1 | 21.0 |
| L | 1 | 10 | 170 | 3 | 19.5 |

EXAMPLE 73

100 g of a polybutadiene oil ($\overline{M}n$ 1,500 and microstructure with 75% cis-1,4-, 24% trans-1,4-, and 1% 1,2-double bonds and a content of conjugated double bonds of <0.5%) was charged into an agitated flask (0.5 l) which was heated and purged with argon and equipped with inert gas connection, stirrer, thermometer, and exhaust gas connection. At room temperature, 10 g of N-methylpyrrolidone, 1.25 g of sodium hydroxide, and 5.0 g of tert-butanol were added thereto. Under agitation and a weak argon stream, the content of the flask was heated to 150° C. The previously colorless mixture was thereby discolored to dark-brown to black.

Sampling was conducted hourly up to a testing period of 3 hours at 150° C. The isomerization reaction was in each case terminated by cooling to room temperature, the volatile components were removed under an oil pump vacuum at 140° C. The final sample was centrifuged for one hour at 3,600 rpm to separate solid components of the catalyst. For neutralizing, gaseous $CO_2$ was introduced (three times the stoichiometric excess with respect to the sodium hydroxide employed).

Examination of all samples with IR showed that the microstructure did not change during the entire time period, i.e., the cis-1,4-proportions valuable for the drying action remained preserved. The content of conjugated diolefins, calculated as weight percent $C_8H_{14}$ by UV absorption, was 21.1% by weight after 3 hours. Conjugated triolefins, calculated as weight percent $C_8H_{12}$, were present to an extent of 0.03% by weight.

EXAMPLES 74-92 AND COMPARATIVE EXAMPLES M-P

Tests with altered reaction conditions and with different polar, aprotic compounds were carried out in the same apparatus and with the same mode of operation as in Example 73. The abbreviations—insofar as not as yet explained—mean the following:

PEG 600 = polyethylene glycol, molecular weight 600
Diglyme = glycol dimethyl ether Our commercial products are, in detail, the following compounds:

MARLIPAL ®34/60 = mixture of isotridecyl and isotetradecyl alcohols etherified with 6 ethylene oxide units MARLIPAL 34/100 = mixture of isotridecyl and isotetradecyl alcohols etherified with 10 ethylene oxide units MARLIPAL 34/200 = mixture of isotridecyl and isotetradecyl alcohols etherified with 20 ethylene oxide units MARLOPHEN ®85 = nonyl phenol etherified with 5 ethylene oxide units MARLOPHEN 89 = nonyl phenol etherified with 9 ethylene oxide units MARLOPHEN 814 = nonyl phenol etherified with 14 ethylene oxide units The results are set forth in Table 15.

TABLE 15

| Example or Comp. Example No. | NaOH (g) | Polar, Aprotic Compound Type | Amount (g) | Temp. (°C.) | Time (h) | Conjugated Diolefins ($C_8H_{14}$) (% by Wt.) |
|---|---|---|---|---|---|---|
| 74 | 1.25 | NMP | 20 | 120 | 5 | 5.1 |
| 75 | 2.5 | NMP | 100 | 150 | 1 | 16.1 |
| 76 | 2.5 | NMP | 10 | 150 | 5 | 13.9 |
| 77 | 2.5 | NMP | 50 | 150 | 2 | 17.5 |
| 78 | 1.25 | NMP | 20 | 180 | 1 | 18.2 |
| 79 | 2.5 | NMP | 20 | 180 | 2 | 12.4 |
| 80 | 1.25 | DMSO | 20 | 150 | 2 | 18.5 |
| 81 | 2.5 | DMSO | 10 | 150 | 5 | 14.4 |
| 82 | 1.25 | DMSO | 20 | 180 | 1 | 15.3 |
| 83 | 2.5 | DMSO | 50 | 150 | 1 | 20.0 |
| 84 | 2.5 | DMF | 50 | 150 | 4 | 10.5 |
| 85 | 1.25 | MARLIPAL 34/60 | 20 | 150 | 3 | 9.7 |
| 86 | 1.25 | MARLIPAL 34/100 | 20 | 150 | 4 | 9.2 |
| 87 | 2.5 | MARLIPAL 34/200 | 20 | 150 | 3 | 15.0 |
| 88 | 1.25 | MARLOPHEN 89 | 20 | 150 | 2 | 11.5 |
| 89 | 2.5 | MARLOPHEN 85 | 20 | 150 | 4 | 18.1 |
| 90 | 2.5 | MARLOPHEN 814 | 20 | 150 | 3 | 20.4 |
| 91 | 1.25 | PEG 600 | 20 | 150 | 5 | 7.6 |
| 92 | 2.5 | Diglyme | 10 | 170 | 4 | 7.7 |
| M | 1.25 | — | — | 150 | 5 | 0.44 |
| N | 2.5 | — | — | 150 | 5 | 0.47 |
| O | 2.5 | — | — | 120 | 5 | 0.42 |
| P | 2.5 | — | — | 180 | 3 | 1.1 |

100 g of polybutadiene oil (see Example 73) and 5 g of t-BuOH were utilized per batch.

EXAMPLES 93-95

Respectively 2.5 g of NaOH, 5 g of tert-butanol, and 20 g of N-methylpyrrolidone were combined with respectively 100 g of various polybutadiene oils in the apparatus described in Example 73, using the same mode of operation. The results are indicated in Table 16.

TABLE 16

| Ex. No. | Type of Oil* | Temp. (°C.) | Time (h) | Conjugated Diolefins ($C_8H_{14}$) (% by Wt.) |
|---|---|---|---|---|
| 93 | VPO | 170 | 4 | 7.1 |
| 94 | PO 130 | 150 | 4 | 5.9 |

TABLE 16-continued

| 95 | PO 160 | 150 | 3 | 7.0 |
|---|---|---|---|---|

| Data for the Starting Oils (Conjugated -ene Content <0.5%) | | | | |
|---|---|---|---|---|
| Type of Oil | $\overline{M}n$ | Distribution of Double Bonds | | |
| | | trans-1,4 | 1,2 | cis-1,4 |
| VPO | 930 | 12 | 42 | 46 |
| PO 130 | 3000 | 19 | 1 | 80 |
| PO 160 | 6000 | 8-16 | 2-4 | 80-90 |

(*)Explanations see Table 4.

EXAMPLES 96-101

Different alcohols were used together with respectively 2.5 g of NaOH, 20 g of N-methylpyrrolidone, and 100 g of the polybutadiene oil employed in Example 73, using the same apparatus and mode of operation as in Example 73.

TABLE 17

| Ex. No. | Alcohol Type | Amount (g) | Temp. (°C.) | Time (h) | Conjugated Diolefins ($C_8H_{14}$) (% by Wt.) |
|---|---|---|---|---|---|
| 96 | n-Butanol | 5 | 150 | 2 | 15.9 |
| 97 | Cyclohexanol | 5 | 150 | 2 | 13.8 |
| 98 | Benzyl Alcohol | 5 | 150 | 1 | 7.9 |
| 99 | 2-Ethylhexanol | 5 | 150 | 4 | 13.4 |
| 100 | Ethanol | 5 | 150 | 2 | 12.1 |
| 101 | 1,2-Propanediol | 5 | 150 | 4 | 7.3 |

The preceding example(s) can be repeated with similar success by substituting the generically or specifically described reactants and/or operating conditions of this invention for those used in the preceding example(s).

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for isomerizing isolated double bonds to form conjugated double bonds in a homo- or copolymer of a 1,3-diene having a molecular weight of 500-20,000, which comprises, contacting the polymer at 0°-220° C., optionally in the presence of a solvent, with an isomerization catalyst which is selected from:

(a) a mixture of hydroxide of the alkali metals potassium, rubidium or cesium, and a $C_{1-10}$-hydrocarbon, mono-or-poly-alkanol, optionally substituted by —$NH_2$ or phenyl;

(b) a mixture of a lithium alcoholate or sodium alcoholate and a reaction compatible potassium, rubidium or cesium salt wherein the alcohol component is of a $C_{1-10}$-hydrocarbon, mono-or-poly-alkanol, optionally substituted by —$NH_2$ or phenyl; or (c) a mixture of sodium hydroxide, a $C_{1-10}$-hydrocarbon, mono-or-poly-alkanol, optionally substituted by —$NH_2$ or phenyl, and a reaction compatible polar, aprotic compound.

2. A process of claim 1 wherein the catalyst is catalyst (a).

3. A process of claim 1 wherein the catalyst is catalyst (b).

4. A process of claim 1 wherein the catalyst is catalyst (c).

5. A process of claim 2 wherein the process is carried out in the presence of a reaction compatible polar, aprotic compound and the reaction temperature is 0°-150° C.

6. A process of claim 3 wherein the process is carried out in the presence of a reaction compatible polar aprotic compound and the reaction temperature is 0°-150° C.

7. A process of claim 4 wherein the polar, aprotic compound is dimethyl sulfoxide, dimethylformamide, N-methylpyrrolidone, or a polyethylene glycol diether of the formula R—O—$(CH_2$—$CH_2$—O$)_n$R, wherein n is 1 to 20 and R is $C_{1-4}$-alkyl.

8. A process of claim 5 wherein the polar, aprotic compound is dimethyl sulfoxide, dimethylformamide, N-methylpyrrolidone, or a polyethylene glycol diether of the formula R—O—$(CH_2$—$CH_2$—O$)_n$R, wherein n is 1 to 20 and R is $C_{1-4}$-alkyl.

9. A process of claim 6 wherein the polar, aprotic compound is dimethyl sulfoxide, dimethylformamide, N-methylpyrrolidone, or a polyethylene glycol diether of the formula R—O—$(CH_2$—$CH_2$—O$)_n$R, wherein n is 1 to 20 and R is $C_{1-4}$-alkyl.

10. A process of claim 1 wherein the isomerization is conducted under an inert gas atmosphere.

11. A process of claim 1 wherein the alcohol component in catalyst (a), (b) and (c) is methanol, ethanol, n- or isopropanol, n-, iso-, sec-, or tert-butanol, 2-ethylhexanol, cyclohexanol, benzyl alcohol, glycol, diethylene glycol, ethanolamine, or glycerol.

12. A process of claim 2 wherein the amount of alkali metal hydroxide is 0.2-20 parts by weight and the amount of alcohol is 0.5-20 parts by weight, both per 100 parts by weight of polymer to be isomerized.

13. A process of claim 3 wherein the alcoholate is an isopropylate, a t-butylate or a 2-ethylhexylate of lithium or sodium.

14. A process of claim 3 wherein the K, Rb or Ce salt is a carbonate, sulfate, chloride, formate, acetate, propionate, 2-ethylhexanoate or hydroxide.

15. A process of claim 3 wherein the amount of alcoholate is 0.5-10 parts by weight and the amount of K, Rb or Ce salt is 0.1-25 parts by weight, both per 100 parts by weight of polymer to be isomerized.

16. A process of claim 4 wherein the amount of sodium hydroxide is 0.2-20 parts by weight, the amount of alcohol is 0.5-20 parts by weight and the amount of polar, aprotic compound is 1-100 parts by weight, all per 100 parts by weight of polymer to be isomerized.

17. A process of claim 1 wherein the polymer to be isomerized is a homopolymer of 1,3-butadiene, isoprene, 2,3-dimethylbutadiene, or piperylene.

18. A process of claim 1 wherein the polymer to be isomerized is a copolymer consisting essentially of the monomers, 1,3-butadiene, isoprene, 2,3-dimethylbutadiene, or piperylene.

19. A process of claim 1 wherein the polymer to be isomerized is a copolymer of a monomer which is 1,3-butadiene, isoprene, 2,3-dimethylbutadiene, or piperylene with a monomer which is styrene, α-methylstyrene, vinyltoluene, or divinylbenzene.

* * * * *